US010627496B2

(12) United States Patent
Schmalenberg et al.

(10) Patent No.: US 10,627,496 B2
(45) Date of Patent: Apr. 21, 2020

(54) PHOTONICS INTEGRATED PHASE MEASUREMENT

(71) Applicant: Toyota Motor Engineering & Manufacturing North America, Inc., Erlanger, KY (US)

(72) Inventors: Paul Donald Schmalenberg, Ann Arbor, MI (US); Tsuyoshi Nomura, Novi, MI (US); Jae Seung Lee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 278 days.

(21) Appl. No.: 15/685,277

(22) Filed: Aug. 24, 2017

(65) Prior Publication Data
US 2019/0064332 A1    Feb. 28, 2019

(51) Int. Cl.
*G01C 3/08*      (2006.01)
*G01S 7/4912*    (2020.01)
(Continued)

(52) U.S. Cl.
CPC ........... *G01S 7/4917* (2013.01); *G01S 7/4811* (2013.01); *G01S 7/4817* (2013.01); *G01S 7/4913* (2013.01);
(Continued)

(58) Field of Classification Search
None
See application file for complete search history.

(56) References Cited

U.S. PATENT DOCUMENTS

| 4,348,075 A | * | 9/1982 | Gottlieb | G02F 1/335 |
| | | | | 385/7 |
| 4,395,702 A | * | 7/1983 | Gottlieb | G02B 6/12004 |
| | | | | 341/111 |

(Continued)

OTHER PUBLICATIONS 11.8 Chip-scale electro-optical 3D FMCW lidar with 8 μm ranging precision, Behroozpour University of California, Berkeley, USAet al (Year: 2016).*

(Continued)

*Primary Examiner* — Isam A Alsomiri
*Assistant Examiner* — Amir J Askarian
(74) *Attorney, Agent, or Firm* — Christopher G. Darrow; Darrow Mustafa PC (57) ABSTRACT

System, methods, and other embodiments described herein relate to a photonic apparatus including integrated phase measurement. The photonic apparatus includes a phase shifter operably connected with a source optical waveguide to receive a source light wave and to shift a source phase of the source light wave to produce a shifted light wave with a shifted phase that is different from the source phase. The photonic apparatus includes an output optical waveguide connected with the phase shifter to provide the shifted wave and a reference optical waveguide operably connected with the source optical waveguide to provide the source light wave. The photonic apparatus includes a combiner to combine the shifted light wave with the source light wave to produce a combined light wave. The photonic apparatus includes a detector to determine a difference in phases between the shifted phase and the source phase as embodied in the combined wave.

12 Claims, 6 Drawing Sheets

(51) Int. Cl.
- *G01S 17/36* (2006.01)
- *G02F 1/225* (2006.01)
- *G01S 7/4913* (2020.01)
- *G02F 1/29* (2006.01)
- *G01S 7/481* (2006.01)

(52) U.S. Cl.
CPC .............. *G01S 17/36* (2013.01); *G02F 1/225* (2013.01); *G02F 1/292* (2013.01)

(56) References Cited

U.S. PATENT DOCUMENTS

| | | | | |
|---|---|---|---|---|
| 4,686,533 | A * | 8/1987 | MacDonald | H01Q 3/26 342/371 |
| 5,106,192 | A * | 4/1992 | Tucker | G01S 17/325 356/477 |
| 5,191,339 | A * | 3/1993 | Riza | H01Q 3/22 342/368 |
| 5,307,073 | A * | 4/1994 | Riza | G02F 2/002 342/368 |
| 5,694,216 | A * | 12/1997 | Riza | G01B 9/02004 356/485 |
| 5,859,611 | A * | 1/1999 | Lam | H01Q 3/22 342/368 |
| 6,124,827 | A | 9/2000 | Green et al. | |
| 6,587,615 | B1 * | 7/2003 | Paiam | G02B 6/12014 385/24 |
| 6,891,149 | B1 * | 5/2005 | Lewis | G01J 9/02 250/216 |
| 7,414,577 | B2 | 8/2008 | Mohamadi | |
| 7,848,370 | B2 * | 12/2010 | Kewitsch | H01S 3/2383 372/23 |
| 8,467,641 | B2 | 6/2013 | Krill et al. | |
| 8,478,137 | B2 | 7/2013 | Komaki et al. | |
| 8,615,028 | B1 * | 12/2013 | Sayyah | H01S 5/423 372/50.1 |
| 9,124,373 | B2 | 9/2015 | Aflatouni et al. | |
| 9,525,489 | B2 | 12/2016 | Schuetz | |
| 9,559,483 | B2 | 1/2017 | Fermann et al. | |
| 9,683,928 | B2 | 6/2017 | Swanson | |
| 2003/0063884 | A1 * | 4/2003 | Smith | G02B 6/032 385/129 |
| 2004/0145801 | A1 * | 7/2004 | Rice | H01S 3/2383 359/349 |
| 2005/0135815 | A1 * | 6/2005 | Gerwe | H01Q 3/2676 398/188 |
| 2006/0239312 | A1 * | 10/2006 | Kewitsch | H01S 5/0683 372/29.023 |
| 2008/0253713 | A1 * | 10/2008 | Piede | G02B 6/12004 385/14 |
| 2010/0237958 | A1 * | 9/2010 | Goel | H03F 3/45188 331/135 |
| 2013/0044309 | A1 * | 2/2013 | Dakin | G01S 7/4814 356/4.09 |
| 2014/0016182 | A1 * | 1/2014 | Hotta | G02F 1/2955 359/320 |
| 2014/0232598 | A1 * | 8/2014 | Dai | H01Q 3/34 342/372 |
| 2015/0139352 | A1 * | 5/2015 | Matsuo | H01Q 3/267 375/295 |
| 2015/0346340 | A1 * | 12/2015 | Yaacobi | G01S 17/36 356/5.11 |
| 2018/0031689 | A1 * | 2/2018 | Ben-Ari | G01S 13/4454 |
| 2018/0039153 | A1 * | 2/2018 | Hashemi | G02F 1/2955 |
| 2018/0039154 | A1 * | 2/2018 | Hashemi | G02F 1/2955 |
| 2018/0364336 | A1 * | 12/2018 | Hosseini | G01S 7/4817 |

OTHER PUBLICATIONS

Dual-sideband linear FMCW lidar with homodyne detection for application in 3D imaging, Sandborn et alUniversity of California, Berkeley, Cory Hall, Berkeley, (Year: 2016).*
A 77-GHz Phased-Array Transceiver With On-Chip Antennas in Silicon: Transmitter and Local LO-Path Phase Shifting, Natarajan et al (Year: 2006).*
Monolithic optical phased-array transceiver in a standard SOI CMOS process, Abediasl et al (Year: 2015).*
Phase-shifter using submicron silicon waveguide couplers with ultra-small electro-mechanical actuator, Taro Ikeda et al. (Year: 2010).*
15.4 A 1024-element scalable optical phased array in 0.18 μm SOI CMOS, Chung et al. (Year: 2017).*
Using an FPGA digital clock manager to generate sub-nanosecond phaseshifts for lidar applications, Gaughan et al (Year: 2010).*
RF-inspired silicon photonics: Beamforming at optical frequencies, Abediasl et al (Year: 2016).*
Design Methodology and Architectures to Reduce the Semiconductor Laser Phase Noise Using Electrical Feedforward Schemes, Aflatouni et al (Year: 2010).*
Efficient, compact and low loss thermo-optic phase shifter in silicon, Harris et al (Year: 2014).*

* cited by examiner

PHOTONICS INTEGRATED PHASE MEASUREMENT

TECHNICAL FIELD

The subject matter described herein relates in general to a silicon photonic device and, more particularly, to an integrated phase measurement device embedded within a light detection and ranging (LIDAR) sensor.

BACKGROUND

Environmental perception can be a challenge for electronic devices. For example, electronic devices that operate autonomously such as robots and vehicles generally use one or more sensors to perceive a surrounding environment so that the devices can determine a location within the environment and map objects and obstacles. In this way, the autonomous electronic devices can determine paths through the environment when autonomously navigating and/or provide assistance to an operator in order to avoid objects or otherwise map the environment. However, sensors such as light/laser detection and ranging (LIDAR/LADAR) sensors can be cumbersome due to large sizes/weights associated with such devices and moving parts that, for example, rotate in order to provide a wide scanning field. Moreover, an ability to accurately control a LIDAR sensor can be encumbered further when considering additional calibration and/or measurement devices that may be used for initially calibrating and subsequently maintaining such devices.

SUMMARY

An example of a solid-state phased array LIDAR/LADAR that is configured with integrated phase measurement is presented herein. In one embodiment, an integrated phase measurement aspect of the phased array LIDAR sensor is incorporated with an array of phase shifters. For example, in order to ensure that the individual phase shifters in the array are properly shifting an optical signal, the outputs of the phase shifters include an additional output waveguide that splits a shifted output signal from the phase shifters to the integrated phase measurement components. Accordingly, a crossover structure includes a reference optical waveguide that provides a source optical signal in an original state and thus with an original phase prior to being shifted by the phase shifters. The crossover structure provides the reference optical waveguide across the array of phase shifters. As such, the crossover structure also splits the source optical signal and combines the split source optical signal with an output from the phase shifters using an array of combiners. As a result, the split source optical signal is super-positioned with the output signals and provided to the detector for determining a difference (i.e., phase shift). In further examples, the particular input to the detector can be selected in order to determine the phase difference for a particular phase shifter and tune the selected phase shifter. In this way, a solid-state LIDAR device is provided that avoids difficulties with additional equipment and instead integrates phase measurement functionality within the photonic apparatus of the LIDAR device. Moreover, the disclosed LIDAR device can leverage the integrated phase measurement components to overcome variations induced by manufacturing tolerances or ambient temperature changes. Consequently, the integrated phase measurement components provide for an improved robustness of the LIDAR device.

In one embodiment, a photonic apparatus for measuring phase shift is disclosed. The photonic apparatus includes a source optical waveguide operably connected with a light source that provides a source light wave over the source optical waveguide, the source light wave having a source phase. The photonic apparatus includes a phase shifter operably connected with the source optical waveguide to receive the source light wave and to shift the source phase of the source light wave to produce a shifted light wave with a shifted phase that is different from the source phase. The photonic apparatus includes an output optical waveguide connected with the phase shifter to provide the shifted wave and a reference optical waveguide operably connected with the source optical waveguide to provide the source light wave. The photonic apparatus includes a combiner operably connected with the output optical waveguide and the reference optical waveguide to combine the shifted light wave with the source light wave to produce a combined light wave that is a superposition of the shifted light wave and the source light wave. The photonic apparatus includes a detector operably connected with the combiner to receive the combined light wave and to determine a difference in phases between the shifted phase and the source phase as embodied in the combined wave.

In one embodiment, a phased-array light detection and ranging (LIDAR) device is disclosed. The phased-array LIDAR device includes an array of phase shifters operably connected in series. Respective ones of the phase shifters in the array are operably connected with respective output waveguides that provide shifted light waves. The phased-array LIDAR device includes a source optical waveguide operably connected with an initial one of the phase shifters in the array and operably connected with a light source that provides a source light wave over the source optical waveguide. The source light wave having a source phase. The phased-array LIDAR device includes a reference optical waveguide operably connected with the source optical waveguide to provide the source light wave. The phased-array LIDAR device includes crossover structures associated with respective ones of the phase shifters in the array. The crossover structures include combiners that are operably connected with the reference optical waveguide and with respective ones of the phase shifters through associated ones of the output waveguides. The phased-array LIDAR device includes at least one detector operably connected with the combiners to determine a difference in phases between the source phase and a shifted phase of a respective one the shifted light waves.

In one embodiment, a method for dynamically controlling a phase shifter using integrated phase measurement. The method includes, in response to an electronic control signal that indicates an extent of phase shift, adjusting, using an array of phase shifters, a source phase of a source light wave to produce shifted light waves. The method includes determining, within a detector, a difference between the source phase and a shifted phase of a selected one of the shifted light waves from an associated selected phase shifter of the array of phase shifters as selected according to the electronic control signal. The method includes tuning at least the selected phase shifter the phase shifter according to the difference.

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with integrated phase measurement are disclosed herein. As previously noted, devices such as LIDAR sensors are generally calibrated or otherwise tested using stand alone equipment such as separate phase measurement devices. However, using secondary stand alone equipment can be physically cumbersome. Additionally, using such secondary equipment can prolong or otherwise complicate the calibrating/maintenance of the sensor.

Accordingly, in one embodiment, a photonic apparatus for phase measurement is integrated within an optical device. For example, the photonic apparatus is embodied as an integrated structure within an array of phase shifters in a LIDAR device. In one aspect, the phase shifters facilitate steering a beam of light from a phased array antenna of the LIDAR device. Thus, in one embodiment, the LIDAR device is a solid-state LIDAR that uses an optical phased array. In either case, the photonic apparatus is integrated with the array of phase shifters to provide, for example, feedback about an extent of phase shift in order to improve control of the phase shifters. Accordingly, the photonic apparatus can include a connection at the output of each of the phase shifters in order to sample or otherwise split a resulting signal from the respective phase shifters to a phase detector.

Moreover, in further aspects, the photonic apparatus provides crossover structures that function to provide a reference optical signal that is an original light source such that the original source is not diminished or otherwise interfered. Thus, the photonic apparatus can separately combine each of the outputs with the reference optical signal in order to generate an accurate comparison. The combined signals are then selectively provided to the phase detector via an optical switch or other routing mechanism. In either case, the phase detector can determine a phase difference between the original source light wave and the shifted light wave to quantify whether the associated phase shifter is functioning as intended. In this way, a solid-state LIDAR device is provided that avoids difficulties with additional equipment and instead integrates phase measurement functionality within the photonic apparatus of the LIDAR device while providing additional functionality associated with dynamically adjusting phase shifters using feedback from the phase detector.

Figure 1:
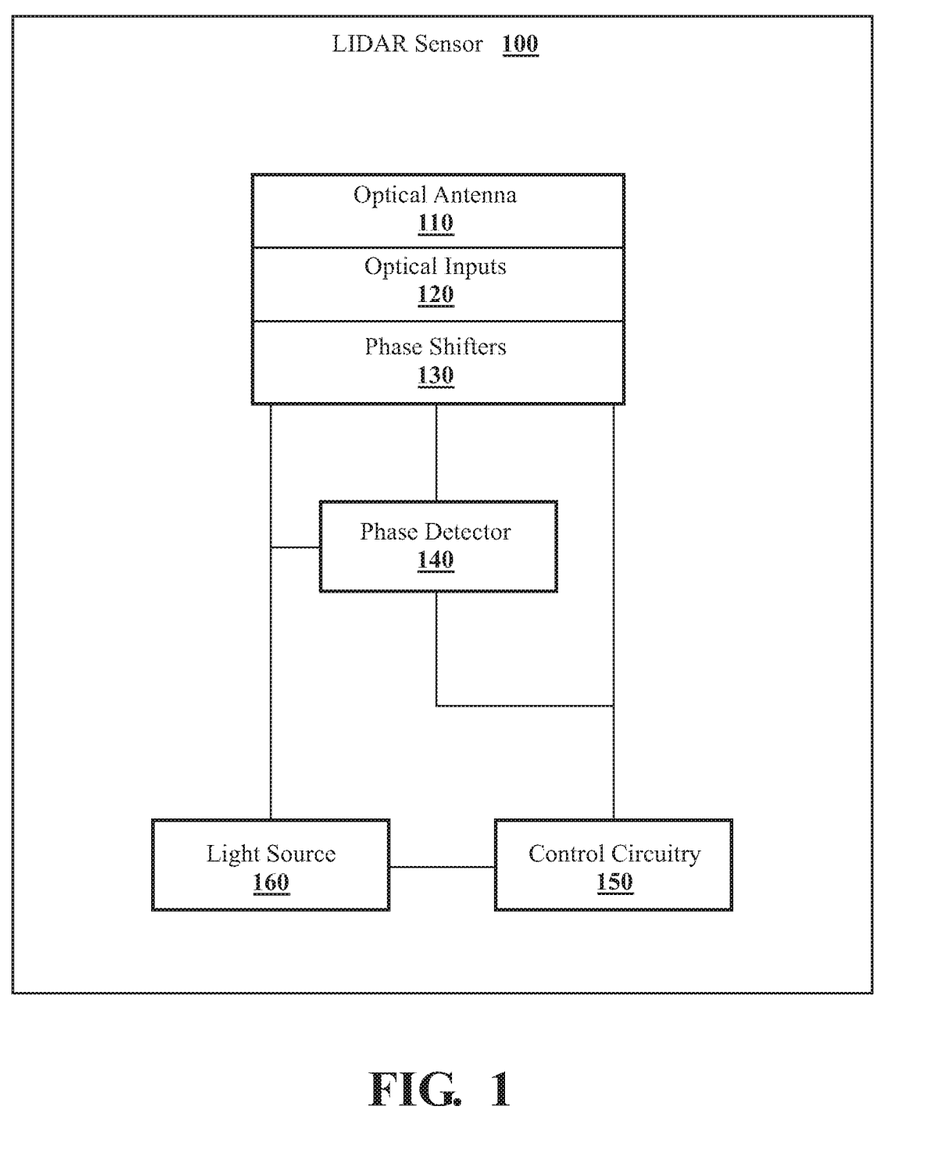
FIG. 1 is a block diagram illustrating one embodiment of a LIDAR sensor.

Referring to FIG. 1, an example of a LIDAR sensor 100 is illustrated. As an initial matter, while a LIDAR is generally discussed herein, the disclosed photonic apparatus for integrated phase measurement can, in further aspects, also be implemented in further systems such as LADAR, and/or other optical systems where a phase of an optical signal is controlled or is otherwise of a concern. Thus, the embodiments disclosed herein are not limited to LIDAR sensors. Moreover, the disclosed LIDAR sensor 100 is generally discussed as being implemented along with electronic devices such as robots, vehicles, and so on; however, it should be appreciated that the disclosed devices, systems, and methods can be integrated with the noted devices or can be provided as standalone sensors. Additionally, as used herein, a "vehicle" is any form of motorized transport. In one or more implementations, a vehicle refers to an automobile. While arrangements will be described herein with respect to automobiles, it will be understood that embodiments are not limited to automobiles. In some implementations, the vehicle may be any other form of motorized transport that, for example, benefits from data provided via the LIDAR sensor 100.

As an additional note, the LIDAR sensor 100 also includes various elements. It will be understood that in various embodiments it may not be necessary for the LIDAR sensor 100 to have all of the elements shown in FIG. 1. The LIDAR sensor 100 can have any combination of the various elements shown in FIG. 1. Further, the LIDAR sensor 100 can have additional elements to those shown in FIG. 1. In some arrangements, the LIDAR sensor 100 may be implemented without one or more of the elements shown in FIG. 1. Further, while the various elements are shown as being located within the LIDAR sensor 100 in FIG. 1, it will be understood that one or more of these elements can be located external to the LIDAR sensor 100. Further, the elements shown may be physically separated by variable distances.

Some of the possible elements of the LIDAR sensor 100 are shown in FIG. 1 and will be described along with subsequent figures. However, for purposes of brevity of this description, some elements that may be included within the LIDAR sensor 100 have been omitted from FIG. 1 and the associated discussion. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the LIDAR sensor 100 includes an optical antenna 110 that is implemented as an optical phased array antenna to provide a beam of light from the LIDAR sensor 100. In one embodiment, the antenna 110 receives multiple light waves with different phases through optical inputs 120 that operably connect the optical antenna 110 with phase shifters 130. By providing the separate light waves with varied phases, the LIDAR sensor 100 can direct a beam of light that is emitted from the LIDAR sensor 100 in a particular direction in order to, for example, scan a surrounding environment and/or determine information about a particular locality.

In either case, the phase shifters 130 are configured to provide separate light waves with defined phase differences via the separate optical inputs 120. For example, the phase difference between a first one of the phase shifters 130 and a second one of the phase shifters 130 is, for example, $\delta_1$. Accordingly, the phase differences continue between outputs of subsequent ones of the phase shifters 130 such that a phase difference between the first phase shifter and a third input is $2\delta_1$, a phase difference between the first phase shifter and a fourth phase shifter is $3\delta_1$, and so on.

It should be appreciated that the phase shifters 130 can be arranged in different configurations; however, as discussed herein, the phase shifters 130 are arranged in series with an output of one phase shifter provided as an input to an adjacent subsequent phase shifter in the series. Thus, in one embodiment, each of the phase shifters 130 are controlled to shift a provided light wave by a substantially similar extent. Of course, in further embodiments, the phase shifters 130 can each shift the phase of an input signal by different amounts. The shifted light waves are provided via the optical inputs 120 to the optical antenna 110 such that as the shifted light waves are emitted from the antenna they form a beam of light that is directed in a particular direction according to the differences in phases between the emitted light waves.

Accordingly, the direction in which the beam of light is provided is dependent upon the relative phases of the light waves provided by the phase shifters 130 and emitted from the optical antenna 110. Thus, ensuring the separate phase shifters 130 are accurately shifting a phase of an input light wave according to a selected extent of phase shift can, for example, reduce noise and improve the clarity of the beam of light thereby improving sensor data that is ultimately acquired by the LIDAR sensor 100.

Therefore, in one embodiment, the LIDAR sensor 100 includes an integrated phase measurement apparatus to measure a phase of signals output from the phase shifters 130 in comparison to a source light wave provided by light source 160. As a preliminary note, the light source 160 is a laser or other light source used with silicon photonic devices. Accordingly, a wavelength and other characteristics of a source light wave from the light source 160 can be controlled either dynamically or as a particular aspect of implementation.

In either case, the phase shifters 130 include multiple outputs. For example, the phase shifters 130, in one embodiment, each include an operable connection with the optical antenna 110, with a subsequent/adjacent shifter in the series, and with a phase detector 140. The phase detector 140 is, for example, a photodiode or another particular configuration of material that produces an electric voltage in response to light. Furthermore, while a single phase detector 140 is illustrated, in further embodiments, multiple detectors 140 may be used. That is, for example, a dedicated phase detector 140 may be provided for each of the phase shifters 130. Accordingly, the phase detector 140 can be provided as an array of detector that correspond with the array of phase shifters 130.

The phase detector 140 generally functions by, for example, receiving a combined optical signal that is comprised of a reference optical light that is a light wave provided from the light source 160 without modification and a shifted light wave from a particular one of the phase shifters 130. Accordingly, the combined light wave is, for example, an added form or superposition of the two noted light waves. Consequently, the photo detector 140, in one embodiment, produces a voltage that varies according to an amplitude/phase variation within the combined light wave. Thus, the photo detector 140 can determine the difference in phases between the two light waves according to the generated voltage.

Moreover, in one embodiment, control circuitry 150 receives the voltage from the photo detector 140 and identifies the phase shift of the associated phase shifter therefrom. For example, the control circuitry 150 can use the voltage as an input to a lookup or other electronic control structure that provides an output signal that indicates the phase shift. Thereafter, the control circuitry 150 can tune or otherwise adjust the associated phase shifter to provide a desired phase shift when the determined phase shift is not within a desired tolerance. That is, the control circuitry 150 selectively and dynamically modifies how the phase shifter is shifting the input light wave when results from the photo detector 140 indicate that the phase shift satisfies (e.g., exceeds) a phase threshold that indicates a tolerable amount of variation. In this way, the LIDAR sensor 100 includes an integrated phase measurement apparatus that improves control of the phase shifters 130 while avoiding using secondary devices.

Figure 2:
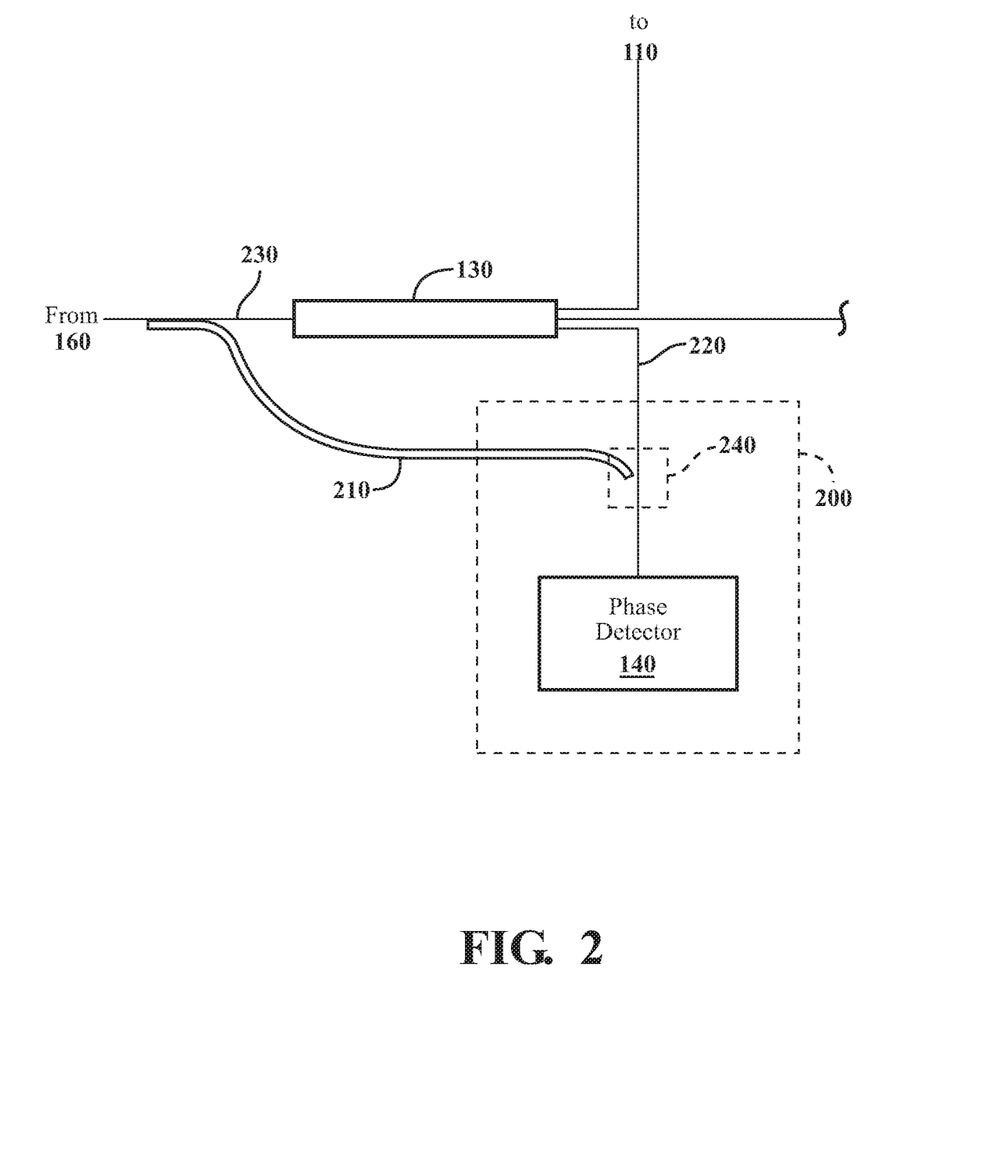
FIG. 2 is a block diagram illustrating one embodiment of an integrated phase measurement apparatus.

As a further matter prior to proceeding with FIG. 2, it should be noted that reference to light waves, optical signals, and light all generally refer to electromagnetic radiation having a particular wavelength. For example, as discussed herein the discussed light waves may be infrared light (e.g., 1550 nm) or a similar wavelength. In further aspects, the particular wavelength of light may be varied according to particular aspects of the implementation.

With reference to FIG. 2, one embodiment of an integrated phase measurement device 200 is illustrated. As an initial matter, it should be noted that the device 200 along with further components such as the phase shifter 130 are chip-scale silicon photonic devices. In one embodiment, the silicon photonic devices discussed herein are further integrated with CMOS integrated circuit devices (e.g., control circuitry 150) to provide additional functionality. In either case, the discussed waveguides, such as reference waveguide 210, output waveguide 220, and so on are structures that are transparent to a wavelength of light carried therein. Moreover, the discussed operable connections are, in one embodiment, couplings between two or more waveguides.

For example, as shown in FIG. 2, the reference waveguide 210 is evanescently coupled with an input waveguide 230. In general, to evanescently couple one waveguide with another waveguide is to locate the waveguides at a relatively close distance apart such that cross-coupling occurs between the waveguides. That is, when an optical signal is propagating through, for example, the input waveguide 230 cross-coupling occurs with the waveguide 210 such that the optical signal is provided on both the waveguide 230 and the waveguide 210. In this way, the propagating signal is effectively split between both waveguides without substantially diminishing the source signal on the waveguide 230. Accordingly, the reference waveguide 210 samples a source light wave with a source phase from the input waveguide 230 through a coupling as discussed. Consequently, the reference waveguide 210 can provide the source light wave to crossover structure 240 for the phase shifter 130 and the phase detector 140 as illustrated in FIG. 2, but also to subsequent crossover structures as will be discussed in greater detail subsequently. It should be noted that while the structure 240 is generally referred to as a crossover or crossover structure 240, in various embodiments, the structure 240 can be a combiner without crossover components or is illustrated without details of the crossover components for purposes of brevity.

Furthermore, the crossover structure 240 further includes a combiner (not illustrated) that joins a branch/split from the reference waveguide 210 together with the output waveguide 220. Thus, the combiner effectively joins the source light wave originating from the light source 160 together with the shifted wave provided by the phase shifter 130. In one embodiment, the combiner is a union between the noted branch and the output waveguide 220 that causes the source light wave to be added together with the shifted light wave. In further aspects, the combiner is a similar structure as the discussed coupling except that the light waves are being joined into a single waveguide instead of split into multiple waveguides. In either case, a resulting combined light wave is provided along the output waveguide 220 to the phase detector 140. As previously indicated, the phase detector 140 is a photodiode or other structure that generates a voltage in response to the incidence of light waves thereon. Further details of the phase detector 140 and the control circuitry 150 will be discussed in relation to FIG. 3.

Figure 3:
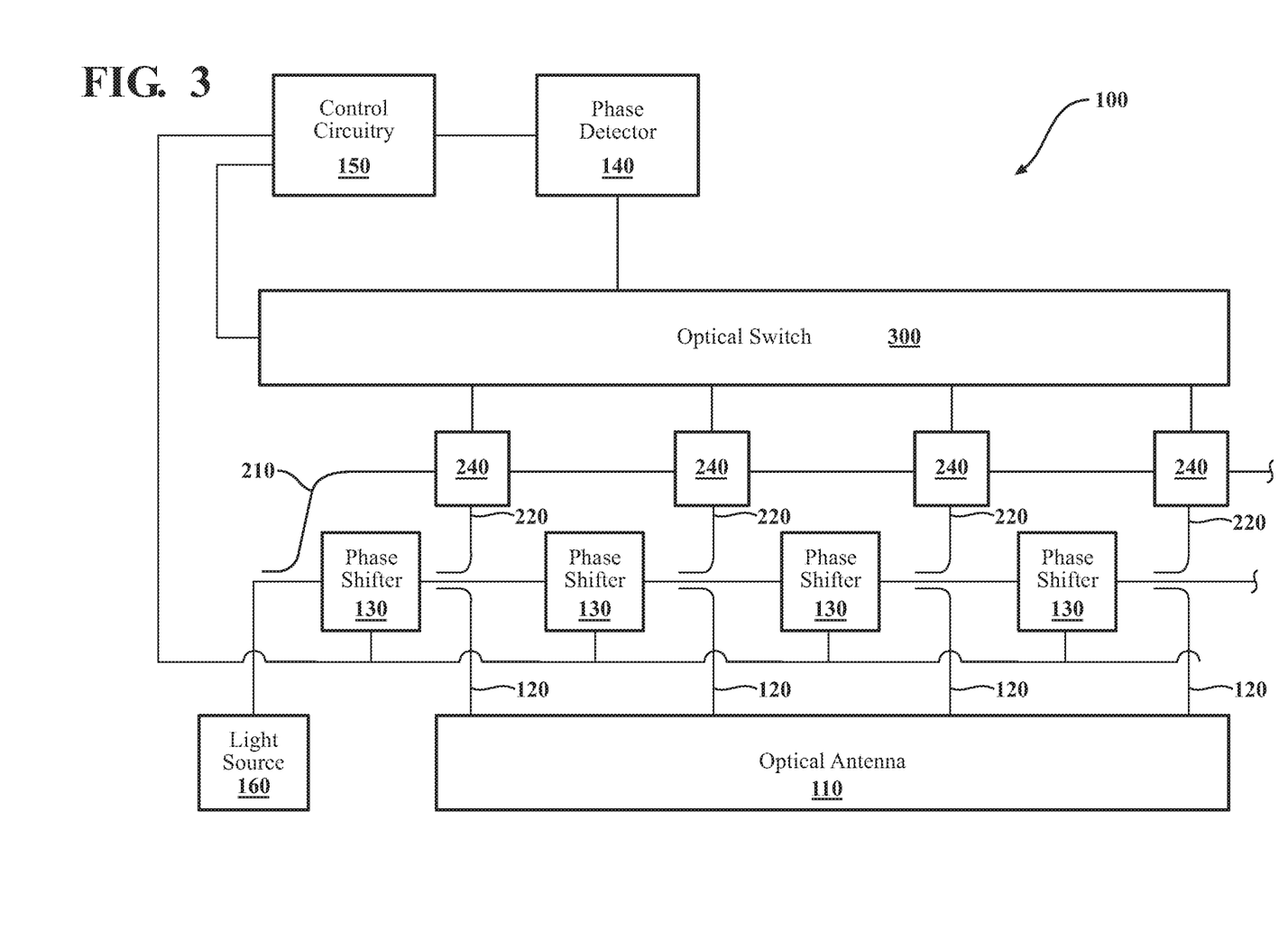
FIG. 3 illustrates one embodiment of an array of phase shifters with integrated phase measurement.

FIG. 3 illustrates another embodiment of the LIDAR sensor 100 from FIG. 1. As shown in FIG. 3, the LIDAR sensor 100 includes many of the same components as shown in FIG. 1 and FIG. 2 while illustrating additional detail. For example, FIG. 3 illustrates an optical switch 300 that is controlled by the control circuitry 150 to selectively connect different combiners to the phase detector 140. That is, an array of crossover structures 240 are illustrated with each of the separate crossover structures being associated with a particular one of the phase shifters 130. In general, the phase shifters 130 are, for example, optical wave guides that separately alter light provided from the light source 160 such that an output of each of the phase shifters has a different phase, as previously indicated. Furthermore, the phase shifters 130 are, in one embodiment, separately tunable by applying heat and/or electrical current to the phase shifters 130.

For example, the control circuitry 150 is operatively connected with the phase shifters 130 via the illustrated control lines. Accordingly, in one embodiment, the control circuitry 150 functions to electronically control the phase shifters 130 to individually adjust phases of the separate light waves according to a defined phase pattern for the separate optical inputs 120. That is, the control circuitry 150, in one embodiment, individually tunes an extent of phase shift provided by each of the phase shifters 130. Accordingly, the control circuitry 150 can provide dynamic adjustments to the phases of the light waves provided to the optical antenna 110. In this way, the control circuitry 150 can control the phases of the light waves to match particular defined phase patterns to steer a beam of light emitted from the antenna 110 in a particular direction.

Accordingly, as part of, or in supplement to, controlling the phase shifters 130 as indicated, the control circuitry 150 can further tune the phase shifters 130 by determining the extent of phase shift provided by a particular one of the phase shifters 130 in the array. For example, the control circuitry 150 can initially control one of the phase shifters to provide an amount x of phase shift in order to provide an emitted beam of light in a particular direction. The control circuitry 150 can then provide control signals to the optical switch 300 so that a combined light wave from a combiner associated with the particular phase shifter of interest is directed to the phase detector 140. Thereafter, the phase detector 140 provides an electronic signal with a particular voltage and/or a voltage pattern (e.g., fluctuations in voltage associated with changing the phase of the combined signal) that is representative of the combined light wave to the control circuitry 150. That is, because the combined signal from the combiner is a combination of the source light wave and the shifted light wave, a resulting combined phase of the combined light wave represents, for example, a difference in phases between the light waves. Thus, the phase detector 140 detects/determines the difference by producing the voltage according to the received form of the combined light wave.

Consequently, the control circuitry 150 can use the signal from the phase detector 140 to determine the shifted phase of the output of the phase shifter 130 and, for example, determine whether the shifted phase aligns with an expected phase shift as requested by the control circuitry 150 through various control signals. That is, the control circuitry 150 determines whether the shifted phase matches a requested phase shift. In one embodiment, the control circuitry 150 uses the received voltage from the phase detector 140 as an input to a look-up table and receives an identification of the shifted phase therefrom. Subsequently, the control circuitry 150 compares the phase shifts to determine a variance. The control circuitry 150 can then assess the variance to determine whether the variance satisfies (e.g., meets and/or exceeds) a phase threshold.

In one embodiment, the phase threshold is a tolerable amount of error between requested phase and the actual phase produced by the phase shifter 130. As such, the control circuitry 150 tunes or otherwise adjusts the associated one of the phase shifters 130 when the variance satisfies the phase threshold. Otherwise, the control circuitry 150 may proceed with checking further ones of the phase shifters 130 without performing additional tuning of the produced phase shift. Moreover, while the process of the control circuitry 150 checking the phase shift is discussed as an isolated action, in further embodiments, the control circuitry 150 can iteratively check the phase shifts of the phase shifters 130, continuously check the phase shifts, intermittently check the phase shifts, check the phase shifts according to a request control signal, and/or according to another indicator. In either case, the control circuitry 150 may check the phase shift of one or more the phase shifters 130 as frequently or infrequently as desired.

Moreover, the particular structure of the optical switch 300, the phase detector 140, and the control circuitry 150 can be varied in different implementations in order to, for example, provide for checking the phase shifts of all or at least multiple ones of the phase shifters 130 in parallel. Thus, in various embodiments, the LIDAR sensor 100 includes multiple phase detectors 140 along with additional control logic included with the control circuitry 150 for supporting the phase detectors 140. As an additional matter, the optical switch 300 is, for example, an optical multiplexer that accepts multiple inputs from the various crossover structures 240 and selectively provides at least one of the inputs as an output to the phase detector 140.

Figure 4:
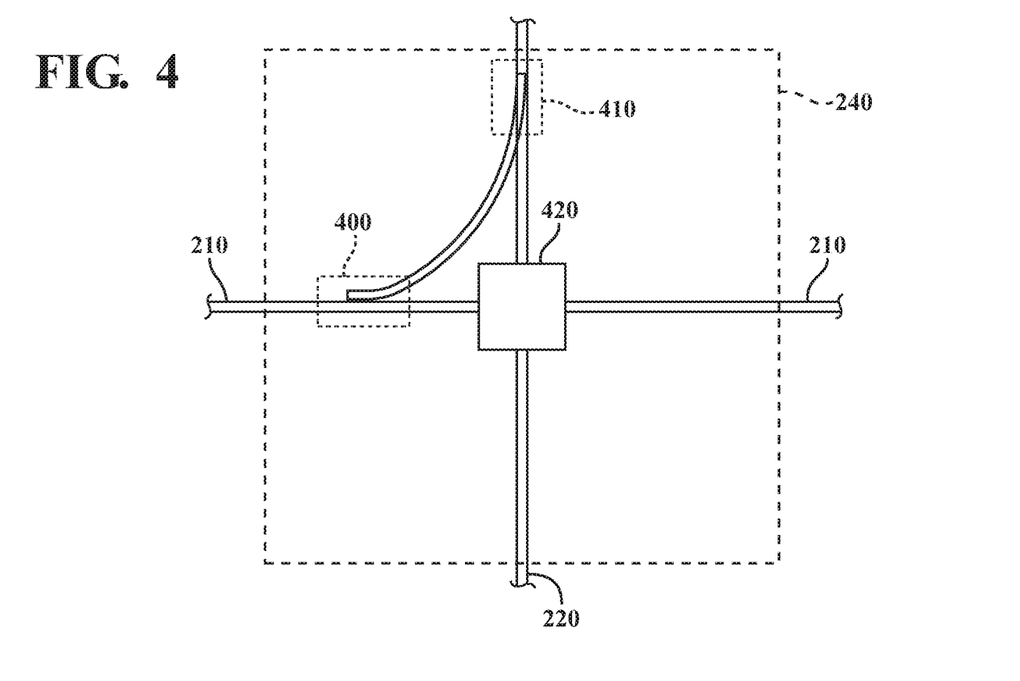
FIG. 4 is a diagram illustrating one embodiment of a crossover structure.

Additionally, further aspects of the crossover structures 240 will be discussed in relation to FIG. 4. FIG. 4 illustrates one example of the crossover structure 240. As illustrated, the crossover structure 240 of FIG. 4 includes the reference optical waveguide 210 and the output waveguide 220 in a configuration with the reference waveguide 210 bridging, or crossing over, the output waveguide 220. Moreover, a branch waveguide is illustrated as being evanescently coupled with the reference waveguide 210 at a coupler 400. The branch waveguide provides the source light wave to a combiner 410. The combiner 410 joins the branch waveguide with the output waveguide 220 in order to combine light waves that are propagating therein. Thus, past the combiner, the output waveguide provides the combined light wave that is comprised of the source light wave and the shifted light wave. It should be appreciated that providing the two light waves on a single waveguide causes the resulting combined light wave to be a superposition or combined form of the two light waves. Thus, depending on a phase of each of the light waves an amplitude across time of the light wave may increase and/or decrease. Thus, the combined light wave represents differences and/or correlations between the source light wave and the shifted light wave over time.

Figure 5:
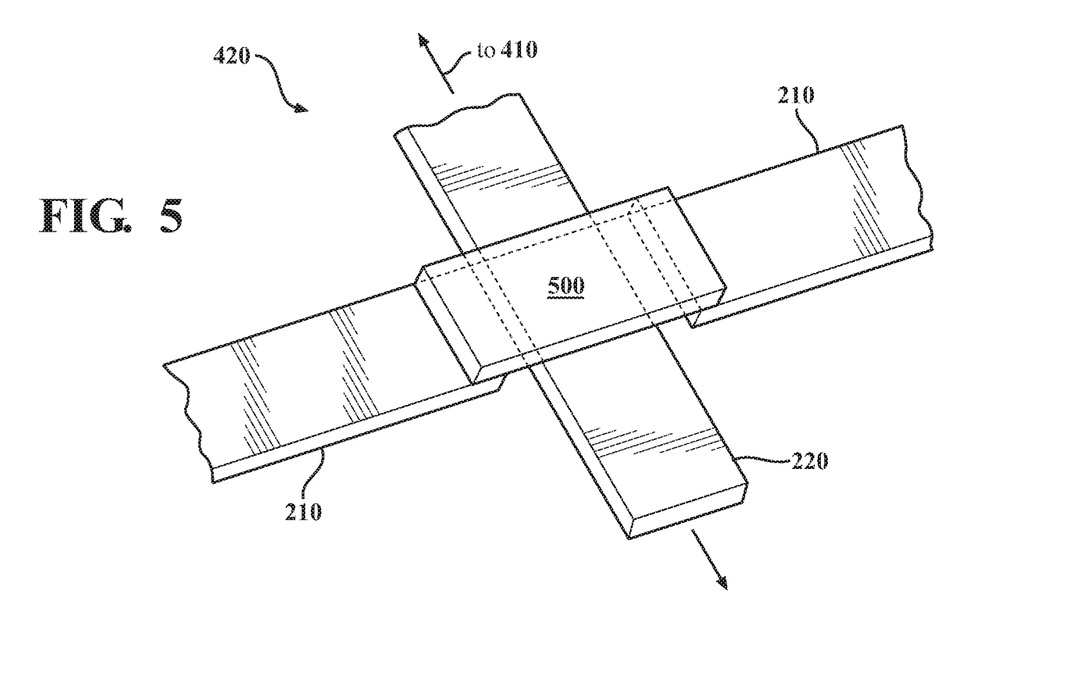
FIG. 5 illustrates one example of a reference optical waveguide crossing over an output optical waveguide of a phase shifter.

Continuing with the crossover structure 240, a crossover point 420, otherwise referred to as bridge 420, is located at an intersection of the reference waveguide 210 and the output waveguide 220. The crossover point 420 allows for the reference waveguide 210 and the output waveguide 220 to cross without interfering with respective signals carried therein. One example of a crossover point 420 is illustrated in FIG. 5. As shown in FIG. 5, the crossover point 420 is a multi-dimensional structure. That is, as illustrated, the crossover point is not planar or substantially included within a single layer of the device 100. Instead, the crossover point 420 utilizes multiple planes for the waveguides 210 and 220 so that the waveguides may cross without interfering. As illustrated in FIG. 5, a bridge structure 500, also referred to as a spanning structure, is illustrated as linking two separate portions of the reference waveguide 210 using a separate plane/layer. Moreover, while illustrated in relation to the reference waveguide 210, the bridge 500 can alternatively be utilized with the output waveguide 220. Furthermore, while the crossover point 420 is illustrated as a non-planar bridging structure, in further examples, the crossover point 420 and the overall crossover structure 240 can be planar and included within a single layer of the device 100. In such an implementation, the structure of the crossover point 420 is modified as needed to provide the noted functionality. In either case, the crossover point 420 permits the reference waveguide 210 to provide the source light wave for use in determining phase shift for subsequent phase shifters 130 in the array.

Figure 6:
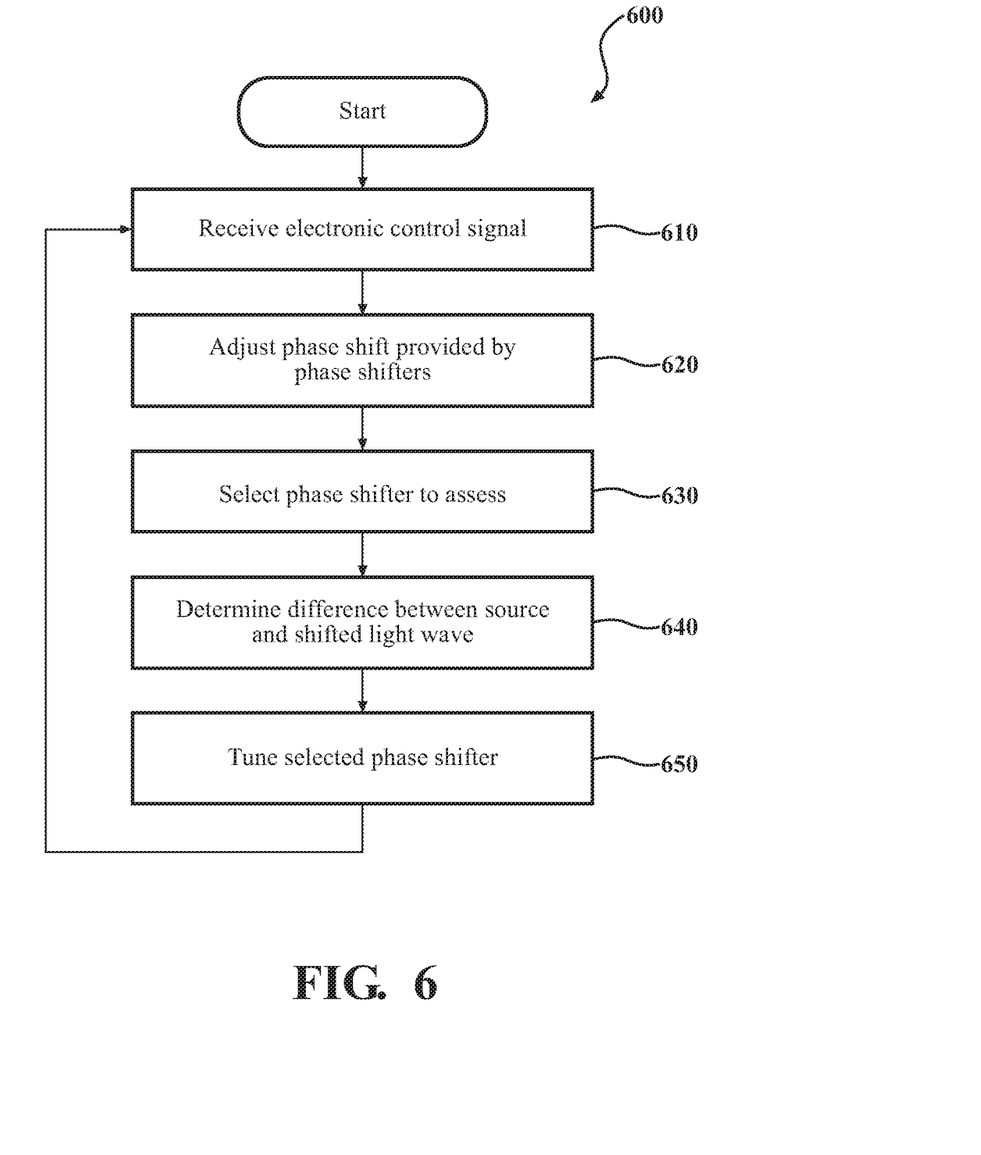
FIG. 6 is a flowchart illustrating one embodiment of a method 600 associated with steering a beam of light using a 2D photonic grating.

Additional aspects of integrated phase measurements will be discussed in relation to FIG. 6. FIG. 6 illustrates a flowchart of a method 600 that is associated with measuring phase shift for selected phase shifters of an array. Method 600 will be discussed from the perspective of the LIDAR sensor 100 of FIG. 1. While method 600 is discussed in combination with the LIDAR sensor 100, it should be appreciated that the method 600 is not limited to being implemented within the LIDAR sensor 100, but is instead one example of a system that may implement the method 600 and associated components.

At 610, an electronic control signal is received that indicates an extent of phase shift to provide using one or more of the phase shifters 130. In one embodiment, the control circuitry 150 receives the electronic control signal from an autonomous driving module, or other electronic entity that processes and/or otherwise uses data produced by the LIDAR sensor 100. For example, in one embodiment, the LIDAR sensor 100 produces point cloud data about a surrounding environment of the LIDAR sensor 100 that is used to detect objects, obstacles, and other aspects of the surrounding environment. The autonomous driving module can use the point cloud data to identify a path through the surrounding environment, identify hazards, track objects, and so on.

In either case, the autonomous driving module can produce the electronic control signal to request sensor data from the LIDAR sensor 100 about a particular locality in the surrounding environment, and/or as an update to the sensor data. Alternatively, or additionally, in one embodiment, the electronic control signal is generated internally to the LIDAR sensor 100 to cause the control circuitry 150 to regularly scan the surrounding environment in a sweeping and repetitive manner in order to continuously provide an updated view of the surrounding environment. In either case, the electronic control signal generally indicates a phase or phase pattern for controlling an emitted beam of light to have a particular direction.

At 620, the phase shifters 130 are adjusted according to the phase and/or phase pattern indicated by the control signal. In one embodiment, the control circuitry 150 can separately tune the phase shifters 130 such that that the phase shifters 130 separately modulate separate light waves to have distinct phases. In one embodiment, the phase shifters 130 are optical wave guides that are thermally or electrically tuned according to controls provided through the control circuitry 150. In either case, a particular pattern of phases between the respective phase shifters 130 controls, for example, a position/direction of the beam of light.

At 630, a phase shifter is selected to determine an extent of phase shift from the selected phase shifter. In one embodiment, the control circuitry 150 iteratively progresses through individual phase shifters in the array to check the phase shifters 130 and ensure the phase shifters 130 are functioning as desired. In further aspects, the control circuitry 150 can select a particular one of the phase shifters 130 with a suspected difficulty and/or randomly assess a particular one of the phase shifters 130. In either case, the control circuitry 150 controls the optical switch 300 to provide an operable pathway for an associated output waveguide 220 to the phase detector 140 (also referred to as a photo detector 140 herein).

At 640, a difference between the source phase of the source light wave and a shifted phase of a selected one of the shifted light waves from an associated selected phase shifter of the array is determined. In one embodiment, the phase detector 140 determines the difference by converting a combined light wave that is incident upon the phase detector 140 into an analogous voltage. As previously noted, the combined light wave is a combination of the source light wave and the shifted light wave. Thus, the voltage provided by the phase detector 140 is indicative of a difference in phases between the two light waves.

At 650, the extent of phase shift provided by the selected phase shifter is modified. In one embodiment, control circuitry 150 tunes the extent of phase shift provided by a particular phase shifter when the difference provided by the phase detector 140 for the selected phase shifter indicates a variance from a desired amount of phase shift that satisfies a phase threshold. Thus, the control circuitry 150 can check and adjust operation of the phase shifters 130 to ensure an extent of provided phase shift is sufficiently accurate.

As an additional note, while the blocks 610-650 are discussed in a serial manner, in various implementations, one or more of the blocks 610-650 execute in parallel. For example, blocks 610-620 may execute iteratively while blocks 630-650 execute iteratively in parallel such that the phase shift of individual phase shifters is nearly continuously monitored and tuned.

Figure 7:
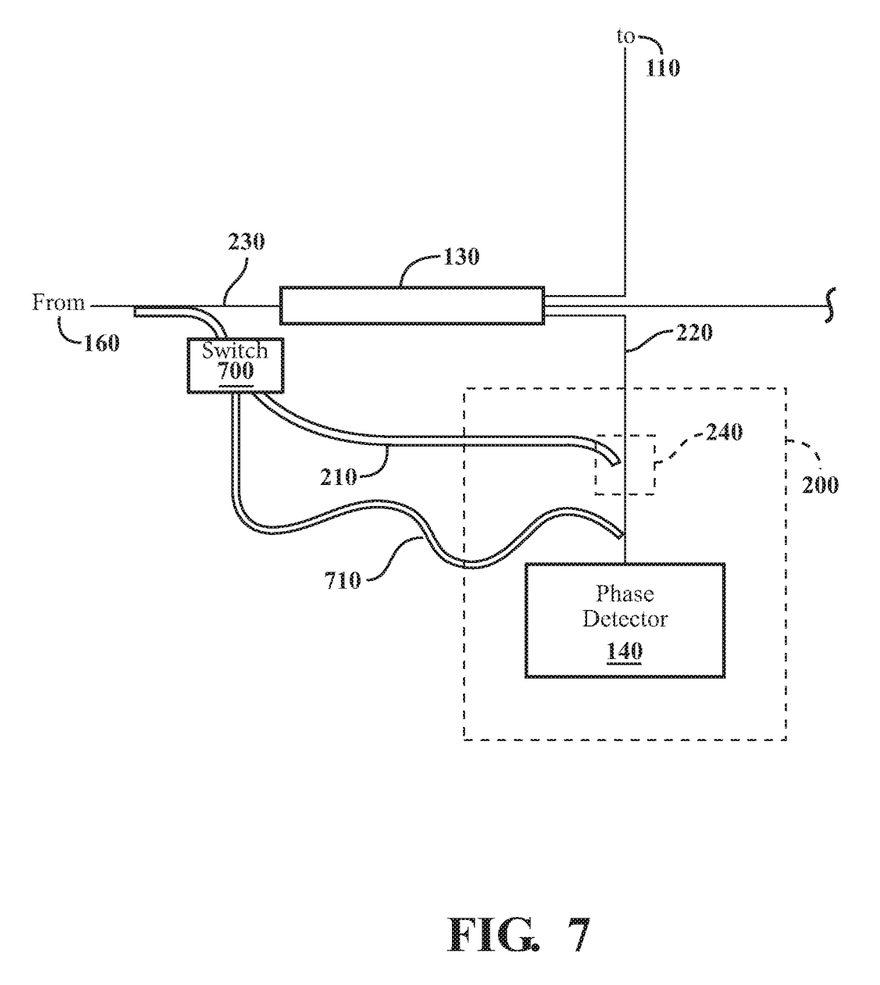
FIG. 7 is a diagram illustrating another embodiment of an integrated phase measurement apparatus.

With reference to FIG. 7, one embodiment of the lidar sensor 100 of FIG. 1 is further illustrated. As shown in FIG. 7, the LIDAR sensor 100 includes a switch 700 and a delay line 710. The switch 700 is controlled by, for example, the control circuitry 150 to switch between providing the source light wave to the phase detector 140 on the reference waveguide 210 or the delay line 710. The control circuitry 150 controls the switch 700 to select between the waveguide 210 and the delay line 710 in order to resolve phase ambiguity in regards to whether a phase shift is a positive or negative value. For example, the control circuitry 150 can activate the delay line when a detected phase shift is 45 degrees in order to further resolve whether the 45 degrees of phase shift is positive or negative. In this way, the integrated phase measurement components can precisely indicate the phase shift.

FIG. 1 will now be discussed in further detail as an example environment within which the system and methods disclosed herein may operate. The LIDAR sensor 100 can include one or more processors 110. In one or more arrangements, the processor(s) can be a main processor of the LIDAR sensor 100. For instance, the processor(s) can be an electronic control unit (ECU). The LIDAR sensor 100 can include one or more data stores for storing one or more types of data. The data store can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store can be a component of the processor(s), or the data store can be operably connected to the processor(s) for use thereby. The term "operably connected," as used throughout this description, can include direct or indirect connections, including connections without direct physical contact, electrical connections, optical connections, and so on.

The one or more data stores can include sensor data. In this context, "sensor data" refers to information produced by the LIDAR sensor 100 from transmitting the beam of light and receiving responses thereto. As will be explained below, the LIDAR sensor 100 can be a part of a sensor system of a vehicle or other device. The sensor system can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system includes a plurality of sensors (e.g., multiple LIDAR sensors), the sensors can function independently from each other. Alternatively, two or more of the sensors can work in combination with each other. In such a case, the two or more sensors can form a sensor network. The sensor system and/or the one or more sensors can be operably connected to the processor(s), the data store(s), and/or another element of the LIDAR sensor 100 (including any of the elements shown in FIG. 1). The sensor system can acquire data of at least a portion of the external environment of the LIDAR sensor 100 (e.g., nearby vehicles, obstacles).

As an example, in one or more arrangements, the sensor system can include one or more radar sensors, one or more LIDAR sensors, one or more sonar sensors, and/or one or more cameras. The processor(s), and/or the autonomous driving module(s) can be operably connected to communicate with the various vehicle systems and/or individual components thereof. For example, returning to the processor(s) and/or the autonomous driving module(s) can be in communication to send and/or receive information from the various vehicle systems to control the movement, speed, maneuvering, heading, direction, etc. of a vehicle. The processor(s), and/or the autonomous driving module(s) may control some or all of the systems of a vehicle and, thus, may be partially or fully autonomous.

The LIDAR sensor 100 can include one or more modules. The modules can be implemented as computer-readable program code that, when executed by a processor, implement one or more of the various processes described herein. One or more of the modules can be a component of the processor(s), or one or more of the modules can be executed on and/or distributed among other processing systems to which the processor(s) is operably connected. The modules can include instructions (e.g., program logic) executable by one or more processor(s). Alternatively, or in addition, one or more data stores may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A photonic apparatus for measuring phase shift, comprising:
    a source optical waveguide operably connected with a light source that provides a source light wave over the source optical waveguide, the source light wave having a source phase;
    a phase shifter operably connected with the source optical waveguide to receive the source light wave and to shift the source phase of the source light wave to produce a shifted light wave with a shifted phase that is different from the source phase;
    an output optical waveguide connected with the phase shifter to provide the shifted light wave;
    a reference optical waveguide operably connected with the source optical waveguide to provide the source light wave;
    a combiner operably connected with the output optical waveguide and the reference optical waveguide to combine the shifted light wave with the source light wave to produce a combined light wave that is a superposition of the shifted light wave and the source light wave;
    a detector operably connected with the combiner to receive the combined light wave and to determine a difference in phases between the shifted phase and the source phase as embodied in the combined light wave;
    an optical switch operably connected with an array of phase shifters including the phase shifter to selectively provide outputs associated with the array of phase shifters to the detector according to an electronic control signal that indicates which of the outputs to connect with the detector, wherein the detector is connected with each of the phase shifters in the array of phase shifters to provide detected differences for the whole array of phase shifters; and
    control circuitry operably connected with the detector to receive an electronic phase signal from the detector indicating the difference and operably connected with the phase shifter to dynamically adjust the phase shifter to tune the difference between the source phase and the shifted phase as embodied in the combined light wave.

2. The photonic apparatus of claim 1,
    wherein the array of phase shifters are operably connected in series with an output of a previous phase shifter in the array as an input to a subsequent phase shifter in the array, wherein the output optical waveguide is operably connected with a subsequent phase shifter in the array of phase shifters that is positioned after the phase shifter.

3. The photonic apparatus of claim 2, further comprising:
    an array of combiners including the combiner, wherein the array of combiners are operably connected with the reference optical waveguide via an array of couplers and combine outputs of respective ones of the array of phase shifters with the source light wave to produce separate combined light waves for the array of combiners.

4. The photonic apparatus of claim 1, further comprising:
a crossover structure including the combiner and a coupling that evanescently splits the source light wave from the reference optical waveguide to provide the source light wave to the combiner, wherein the crossover structure further includes a spanning structure that carries the reference optical waveguide over the output optical waveguide.

5. The photonic apparatus of claim 1, wherein the combiner is a junction between a split branch of the reference optical waveguide and the output optical waveguide that combines the source light wave with the shifted light wave by joining the source light wave and the shifted light wave within a single waveguide.

6. The photonic apparatus of claim 1, wherein the reference optical waveguide is evanescently coupled to the source optical waveguide to avoid attenuating the source light wave while providing the source light wave on multiple optical pathways.

7. The photonic apparatus of claim 1, wherein the photonic apparatus is integrated within a phased array light detection and ranging (LIDAR) device, and wherein the phase shifter is operably connected with a phased array antenna of the LIDAR device to emit a beam of light.

8. A phased-array light detection and ranging (LIDAR) device, comprising:
an array of phase shifters operably connected in series, wherein respective ones of the phase shifters in the array are operably connected with respective output waveguides that provide shifted light waves;
a source optical waveguide operably connected with an initial one of the phase shifters in the array and operably connected with a light source that provides a source light wave over the source optical waveguide, the source light wave having a source phase;
a reference optical waveguide operably connected with the source optical waveguide to provide the source light wave;
crossover structures associated with respective ones of the phase shifters in the array, the crossover structures including combiners that are operably connected with the reference optical waveguide and with respective ones of the phase shifters through associated ones of the output waveguides;
at least one detector operably connected with the combiners to determine a difference in phases between the source phase and a shifted phase of a respective one the shifted light waves;
an optical switch operably connected with the combiners to selectively provide a combined light wave from one of the combiners to the at least one detector; and
control circuitry operably connected with the detector to receive an electronic phase signal from the detector indicating the difference and operably connected with the phase shifter to dynamically adjust the phase shifter to tune the difference between the source phase and the shifted phase as embodied in a combined light wave from a respective one of the combiners.

9. The phased-array LIDAR device of claim 8, wherein the crossover structures include couplings that evanescently split the source light wave from the reference optical waveguide to provide the source light wave to the combiners, wherein the crossover structure further includes a spanning structure that carries the reference optical waveguide over the output waveguides.

10. The phased-array LIDAR device of claim 8, wherein the combiners are junctions between a split branch of the reference optical waveguide and respective ones of the output waveguides that combines the source light wave with the shifted light wave by joining the source light wave and the shifted light wave within a single waveguide.

11. The phased-array LIDAR device of claim 8, wherein the reference optical waveguide is evanescently coupled to the source optical waveguide to avoid attenuating the source light wave while providing the source light wave on multiple optical pathways.

12. The phased-array LIDAR device of claim 8, wherein the reference optical waveguide is evanescently coupled with the source optical waveguide, and wherein the array of phase shifters are operably connected with a phased array antenna of the LIDAR device to emit a beam of light.

\* \* \* \* \*